(12) United States Patent  
Pesach

(10) Patent No.: US 7,056,011 B2  
(45) Date of Patent: Jun. 6, 2006

(54) PERMITTIVITY BASED TEMPERATURE MEASUREMENT AND RELATED METHODS

(75) Inventor: Benny Pesach, Rosh-Haayin (IL)

(73) Assignee: Glucon Inc., Boulder, CO (US)

( * ) Notice: Subject to any disclaimer, the term of this patent is extended or adjusted under 35 U.S.C. 154(b) by 0 days.

(21) Appl. No.: 10/481,215

(22) PCT Filed: Jun. 19, 2002

(86) PCT No.: PCT/IL02/00482

§ 371 (c)(1),  
(2), (4) Date: Dec. 17, 2003

(87) PCT Pub. No.: WO03/001167

PCT Pub. Date: Jan. 3, 2003

(65) Prior Publication Data

US 2004/0240512 A1 Dec. 2, 2004

(30) Foreign Application Priority Data

Jun. 21, 2001 (IL) .................................... 143904

(51) Int. Cl.  
*G01N 25/20* (2006.01)

(52) U.S. Cl. ........................... 374/43; 374/161

(58) Field of Classification Search ............... 374/43, 374/100, 44, 120, 121, 127, 159, 161; 702/130, 702/134, 136  
See application file for complete search history.

(56) References Cited

U.S. PATENT DOCUMENTS

| | | | |
|---|---|---|---|
| 4,510,437 A * | 4/1985 | Iskander | 324/663 |
| 4,765,179 A | 8/1988 | Fuller et al. | |
| 5,233,306 A * | 8/1993 | Misra | 324/601 |
| 5,363,050 A | 11/1994 | Guo et al. | |
| 5,452,716 A | 9/1995 | Clift | |
| 5,497,099 A | 3/1996 | Walton | |
| 5,569,591 A | 10/1996 | Kell et al. | |
| 5,654,643 A * | 8/1997 | Bechtel et al. | 324/687 |
| 5,744,971 A | 4/1998 | Chan et al. | |
| 5,869,973 A | 2/1999 | Nosov | |

(Continued)

FOREIGN PATENT DOCUMENTS

JP  11-014543  1/1999

(Continued)

OTHER PUBLICATIONS

Cheng, Z. et al.; "Temperature-Domain Analysis of Primary and Secondary Dielectric Relaxation Phenomena in a Non-linear Optical Side-Chain Polymer;" Jun. 15, 1998; Journal of Applied Physics; vol. 83, No. 12; pp. 7799-7807.

(Continued)

*Primary Examiner*—Diego Gutierrez  
*Assistant Examiner*—Mirellys Jagan  
(74) *Attorney, Agent, or Firm*—Fenster & Company

(57) ABSTRACT

A method for determining temperature of a material (32) comprising: measuring at least one of the real and imaginary part of the permittivity of the material (32) at each of at least one frequency (36) for which substantially only a single component of the material contributes to the dielectric permittivity of the material (32), for which known component the permittivity as a function of temperature is known; and using at least one of the determined real and imaginary part of the permittivity at each of the at least one frequency and the dependence of the permittivity of the known component on temperature to determine temperature of the known component and thereby of the material (32).

33 Claims, 5 Drawing Sheets

U.S. PATENT DOCUMENTS

| | | |
|---|---|---|
| 6,115,673 A | 9/2000 | Malin et al. |
| 6,147,503 A | 11/2000 | Nelson et al. |
| 6,278,379 B1 | 8/2001 | Allen et al. |
| 6,309,352 B1 | 10/2001 | Oraevsky et al. |
| 6,449,580 B1 * | 9/2002 | Bardetsky et al. .......... 702/130 |

FOREIGN PATENT DOCUMENTS

| | | |
|---|---|---|
| WO | WO 99/58965 | 11/1999 |

OTHER PUBLICATIONS

Larin, K. et al.; "Monitoring of Temperature Distribution in Tissues with Optoacoustic Technique in Real Time;" Jan. 25, 2000; Proceedings of the SPIE; SPIE; Bellingham, VA, US; vol. 3916; pp. 311-321; XP008008329.

Pethig, R.; "Dielectric and Electronic Properties of Biological Materials;" John Wiley & Sons; pp. 224-239, no date.

* cited by examiner

US 7,056,011 B2

PERMITTIVITY BASED TEMPERATURE MEASUREMENT AND RELATED METHODS

RELATED APPLICATIONS

The present application is a US National Phase of PCT Application No. PCT/IL02/00482, filed on Jun. 19, 2002.

1. Field of the Invention

The invention relates to methods and apparatus for determining temperature and in particular to determining temperature of a material from measurements of the complex dielectric permittivity of the material.

2. Background of the Invention

Temperature measurement is required by an enormous range of activities and processes, and a large variety of devices are available for measuring temperature for different applications, temperature ranges and environmental conditions. Non-invasive devices for measuring temperature of a material usually measure temperature of the material at or near to a surface of the material. Generally, measuring internal temperature of a material involves accessing an internal region of the material invasively and determining a temperature for the internal region. There is an ongoing need for new and alternative methods and devices for measuring temperature conveniently and accurately.

It is well known to use measurements of the complex dielectric permittivity of a material to determine properties of the material and various methods and devices are known for measuring the dielectric permittivity of a material. For example, it is known to measure the dielectric permittivity of a material to determine its composition or its water content and to use measurements of dielectric permittivity to monitor rate of polymerization. PCT publication WO 99/58965, the disclosure of which is incorporated herein by reference, describes an example of using dielectric spectroscopy to evaluate properties of oil. The publication describes measuring the dielectric permittivity of oil by flowing the oil through a capacitor and measuring the capacitance of the capacitor. U.S. Pat. No. 5,744,971, the disclosure of which is incorporated herein by reference, describes a probe for measuring the dielectric permittivity of a material by reflecting electromagnetic waves from the material. The inventors of the probe suggest that it can be used for depth profiling of paintings or to determine how rapidly methanol applied to a region of a painting to de-acidify paint in the region evaporates.

It is also well known that in general, the dielectric permittivity of a material is dependent on the material's temperature. To provide meaningful results, an assay or testing process that measures the dielectric permittivity of a material to determine a property of the material generally performs the measurements at known and carefully controlled temperatures. For example, in the processes described in WO 99/58965, to determine properties of an oil, the dielectric permittivity of the oil is measured as a function of temperature over a controlled range of temperatures.

However, whereas, it is known to determine many different properties of materials by measuring their dielectric permittivities, and it is known that values of dielectric permittivities depend on temperature, it appears not to be known to determine temperature of materials by measuring their dielectric permittivities. In addition, it has not appeared to be practical to use measurements of the dielectric permittivity of a material to determine the material's temperature.

The dielectric permittivity of a material is in general a complicated function of the types and relative amounts of components that make up the material and contaminants found therein. As noted in WO 99/58965, for example, the ratio of the imaginary part to the real part of the dielectric permittivity of an oil can be a function of acid content and water content of the oil. Therefore, since the exact composition of a material whose temperature is to be measured is often not known, it is not obvious how to relate a measurement of the material's dielectric permittivity to the temperature of the material.

In addition, measuring the dielectric permittivity of a material typically involves applying a changing, often high frequency, electric field to the material. Not only is the dielectric permittivity of a material in general a function of the frequency of the applied field, but the applied field also loses energy to the material and tends to heat the material. Since the very act of measuring the dielectric permittivity of a material tends to change the material's temperature, it does not appear to be advantageous to attempt to measure temperature of a material by measuring its dielectric permittivity.

SUMMARY OF THE INVENTION

An aspect of the present invention relates to providing methods of measuring temperature of an object by determining a (generally complex) dielectric permittivity of the object. The terms "dielectric permittivity" or "permittivity" of a material as used herein refer to the complex permittivity of a material relative to the permittivity of free space, which is real and equal to about $8.85 \times 10^{-12}$ F/m.

An aspect of some embodiments of the present invention relates to determining the dielectric permittivity of a single known component of a material in order to determine the temperature of the material. In accordance with various embodiments of the present invention the dielectric permittivity of the single known component is determined by measuring the dielectric permittivity of the material for a frequency at which only the single component contributes to the dielectric permittivity of the material.

As noted above, the dielectric permittivity of a material is a function of frequency of an applied field used in measuring the dielectric permittivity and in general, at any particular frequency, a number of different components of the material contribute to the dielectric permittivity. However for some materials, a range of frequencies, hereinafter referred to as "isolation frequencies", can be found, for which substantially only one of the components, hereinafter an "indicator component", contributes to the dielectric permittivity of the material. Measurements of the dielectric component of the material at an isolation frequency of the indicator component can therefore be used to determine the dielectric permittivity of the indicator component. Assuming that the dependence of the dielectric permittivity of the indicator component on temperature is known, the determined dielectric permittivity can be used to determine a temperature of the material.

However, the dielectric permittivity of a material at an isolation frequency is a function not only of the dielectric permittivity of an indicator component associated with the isolation frequency but also of the concentration of the indicator component in the material. Since the concentration is generally unknown, in accordance with an embodiment of the present invention, a ratio between measurements of the dielectric permittivity of the material is used to determine the material's temperature. In some embodiments of the present invention, the ratio is a ratio between real or imaginary parts of the dielectric permittivity at two different isolation frequencies of an indicator component. In some embodiments of the present invention the ratio is a ratio between the real and imaginary part of the dielectric permittivity at a same isolation frequency of an indicator component. The ratios are independent of concentration of the indicator component and if dependence of the dielectric permittivity of the indicator component of the material on temperature is known, the dependence of the ratios on temperature is known.

A suitable indicator component for many materials, in accordance with an embodiment of the present invention, is water, which is ubiquitously found in various amounts in many materials and is a component of all living organisms. Water is a dipolar molecule that interacts with electromagnetic fields and contributes to the dielectric permittivity of a material in which it is found. In addition, generally, a range of frequencies for an applied electromagnetic field can be found for which substantially only water contributes to the dielectric permittivity of a material in which the water is found.

The dielectric relaxation time of a dipolar molecule in a material is correlated with a time that it takes the molecule to become aligned with a direction of an electric field applied to the material. Let a "dielectric relaxation frequency" of a molecule be the inverse of its dielectric relaxation time. For an applied field having a frequency that is substantially greater than the dielectric relaxation frequency of a molecule in a material, the molecule does not "follow" changes in direction of the applied field and therefore does not contribute substantially to the dielectric permittivity of the material at the frequency.

Water, that is in a liquid state and not bound to another molecule, because of its relatively small size and weight generally has a dielectric relaxation frequency substantially greater than larger and heavier molecules or relatively large structures of matter, such as for example lymphocytes in blood. Therefore, at a frequency close to the dielectric relaxation frequency of liquid "unbound" water, generally referred to as "free water", free water is generally substantially the only dipole molecule that contributes to the dielectric permittivity of a material in which free water is found. In accordance with an embodiment of the present invention, water therefore is a convenient and substantially "universal" indicator component for use in measuring temperature of materials. Typically, the dielectric relaxation frequency for free water is on the order of 20 GHz. Water that is bound to heavier molecules, referred to as "bound water", or "hydrate water" has a relaxation frequency that generally varies from between $10^8$ Hz to about $10^9$ Hz. Hereinafter, the term "water" refers to "free water".

In accordance with an embodiment of the present invention, a temperature of a surface region of a material is measured by measuring the dielectric permittivity of the material at the surface region. Electromagnetic waves at at least one isolation frequency of an indicator component of the material are directed so that they are incident on the surface region. Amplitude and phase of electromagnetic waves reflected by the surface region of the material from the incident waves are measured. The measured amplitudes and phases are used to determine the complex dielectric permittivity of the material for each of the at least one isolation frequency. The dielectric permittivity or permittivities are used to determine the temperature of the material at and close to the surface region.

In accordance with an embodiment of the present invention an internal temperature of a material is determined by measuring the imaginary part of the dielectric permittivity of the material. Electromagnetic waves at at least one an isolation frequency of an indicator component of the material are directed so that they are incident on the material. An amount of energy from each incident wave that passes through the material is measured. The measured amount of transmitted energy at a given isolation frequency is a function of and is used to determine the average imaginary part of the dielectric permittivity of the material at the isolation frequency along the path length of the transmitted energy through the material. The determined imaginary part of the dielectric permittivity for each of the at least one isolation frequency is used to determine an average internal temperature of the material along the path length of the transmitted energy.

An aspect of some embodiments of the present invention relates to limiting energy of an applied field used to measure the dielectric permittivity of a material so that during measurement of the dielectric permittivity, the field does not substantially change the temperature of the material.

An aspect of some embodiments of the present invention relates to correcting measurements of temperature of a material for heating of the material by an electromagnetic field used in determining the dielectric permittivity of the material and thereby the temperature.

The determined imaginary part of the permittivity is used to estimate energy deposited by the field in the material during measurement of the permittivity. The amount of deposited energy, density and specific heat of the material are used to estimate heating of the material during the measurement and to correct a temperature of the material determined from the permittivity.

There is therefore provided in accordance with an embodiment of the present invention, a method for determining temperature of a material comprising: measuring at least one of the real and imaginary part of the permittivity of the material at each of at least one frequency for which substantially only a single known component of the material contributes to the dielectric permittivity of the material, for which known component the permittivity as a function of temperature is known; and using at least one of the determined real and imaginary part of the permittivity at each of the at least one frequency and the dependence of the permittivity of the known component on temperature to determine temperature of the known component and thereby of the material.

Optionally using at least one of the measured real and imaginary part of the permittivity to determine temperature, comprises determining a value for a ratio between the real and imaginary parts of the permittivity measured at a same frequency of the at least one frequency and determining temperature from the value.

Additionally or alternatively, the at least one frequency optionally comprises first and second frequencies and using the measured real and/or imaginary part of the permittivity to determine temperature comprises determining a value for a ratio between the real or imaginary part of the permittivity at the first frequency and the real or imaginary part of the permittivity at the second frequency and determining temperature from the value.

In some embodiments of the present invention, measuring the real and/or imaginary part of the permittivity of the material at each of the at least one frequency comprises measuring the dielectric permittivity near a surface region of the material and determining a temperature comprises determining a temperature of the material at or in the neighborhood of the surface region.

Optionally, measuring the real and/or imaginary part of the permittivity near the surface region comprises measuring reflectance of the surface region for an electromagnetic wave incident thereon and determining the real and/or imaginary part of the permittivity in a region of the material at or in the neighborhood of the surface region from the reflectance.

There is further provided in accordance with an embodiment of the present invention, a method comprising measuring the temperature of each of a plurality of surface regions of a material in accordance with an embodiment of the present invention and using the temperatures determined at the plurality of surface regions to generate a thermal surface map of the material.

In some embodiments of the present invention, measuring the real and/or imaginary part of the permittivity at each of the at least one frequency comprises measuring the real and/or imaginary part of the permittivity inside the material and determining a temperature comprises determining an internal temperature of the material.

Optionally, measuring the real and/or imaginary part of the permittivity inside the material comprises measuring amounts of energy reflected by the material and transmitted through the material from energy of an electromagnetic wave incident on the material and determining from the reflected and transmitted energies an average imaginary part of the permittivity inside the material.

Alternatively or additionally, measuring the real and/or imaginary part of the permittivity inside the material optionally comprises: directing an electromagnetic wave so that it is incident on the material; measuring amplitude and phase of an electromagnetic wave reflected by the material from the incident wave; measuring amplitude and phase of an electromagnetic wave resulting from the incident wave that is transmitted through the material; and determining an average for the real and imaginary parts of the permittivity inside the material from the measured amplitudes and phases.

There is further provided in accordance with an embodiment of the present invention, a method comprising determining the internal temperature of a material at a plurality of internal locations of the material in accordance with an embodiment of the present invention, and using the temperatures determined at the plurality of locations to generate a thermal map of an internal region of the material.

In some embodiments of the present invention, the method comprises limiting power in the incident electromagnetic wave so that during a time that it takes to measure the real and/or imaginary part of the dielectric permittivity, an amount of energy absorbed by the material from the incident wave does not substantially change the temperature of the material.

Optionally, the power is determined so that a rate of temperature change is less than about 0.05 degrees Celsius per second. Optionally, the power is determined so that a rate of temperature change is less than about 0.02 degrees Celsius per second.

In some embodiments of the present invention, determining temperature of the material comprises estimating an amount by which energy absorbed by the material from the incident electromagnetic wave changes temperature of the material during measurement of the real and/or imaginary part of the permittivity and using the estimated change to determine the temperature.

In some embodiments of the present invention, the known component of the material is a dipolar molecule that is not bonded to another molecule. Optionally, the dipolar molecule is water.

Optionally, the at least one frequency is a frequency in a range from about $10^{10}$ Hz to about $50 \times 10^{10}$ Hz.

There is further provided, in accordance with an embodiment of the present invention, a method for determining an amount of radiation absorbed by a material comprising: illuminating the material with the radiation between a first time and a second time; measuring temperature of the material at the first and second times according to the present invention; and using a difference between the measured temperatures at the first and second times to determine an amount of energy absorbed from the radiation by the material.

Optionally, the radiation is electromagnetic radiation. Optionally, the electromagnetic radiation is light. Optionally, the light is IR light. Optionally, the radiation is acoustic radiation.

There is further provided, in accordance with an embodiment of the present invention, a method comprising determining an amount of radiation absorbed by a material at each of a plurality of regions of the material according to the present invention and using the amounts of absorption at the plurality of regions to provide a spatial map of the absorption of the radiation by the material.

There is further provided, in accordance with an embodiment of the present invention, a method for assaying a component of a material comprising: determining an amount of radiation absorbed by the material in accordance with the present invention; determining an absorption coefficient of the component for the radiation from the amount of absorbed energy; and determining a concentration of the component in the material from the determined absorption coefficient and a known absorption cross-section of the component.

There is further provided, in accordance with an embodiment of the present invention, a method of mapping concentration of a component in a material comprising: assaying the component in accordance with the present invention at a plurality of regions of the material; and using the assays at the plurality of regions to map concentration of the material as a function of position.

There is further provided, in accordance with an embodiment of the present invention, a method for determining temperature of a material comprising: measuring at least one of the real and imaginary part of the permittivity of the material at each of at least one frequency for which substantially only a plurality of known components of the material contributes to the dielectric permittivity of the material, wherein for each of the known components the permittivity as a function of temperature is known and concentration of the component relative to the others of the plurality of known components is known; and using at least one of the determined real and imaginary part of the permittivity at each of the at least one frequency and the dependence of the permittivities of the known components on temperature to determine temperature of the material.

There is further provided, in accordance with an embodiment of the present invention, a method for determining an amount of radiation absorbed by a material comprising: illuminating the material with the radiation between a first time and a second time; measuring at least one of the real and imaginary part of the permittivity of the material at first and second temperatures at each of at least one frequency for which substantially only at least one known component of the material contributes to the dielectric permittivity of the material, wherein for each of the at least one known component the permittivity as a function of temperature is known and concentration of the component relative to the others of the at least one known component is known; using at least one of the measured real and imaginary part of the permittivity at the first and second times at each of the at least one frequency, the dependence of the permittivity of each of the at least one known components on temperature and their relative concentrations, to determine a difference of temperature between the first and second times; and using the difference to determine an amount of energy absorbed from the radiation by the material.

In accordance with some embodiments of the present invention the material is living tissue.

In accordance with some embodiments of the present invention the living tissue is tissue in an ear.

BRIEF DESCRIPTION OF FIGURES

Non-limiting examples of embodiments of the present invention are described below with reference to figures attached hereto. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale. The figures are listed below.

DETAILED DESCRIPTION OF EXEMPLARY EMBODIMENTS

Figure 1:
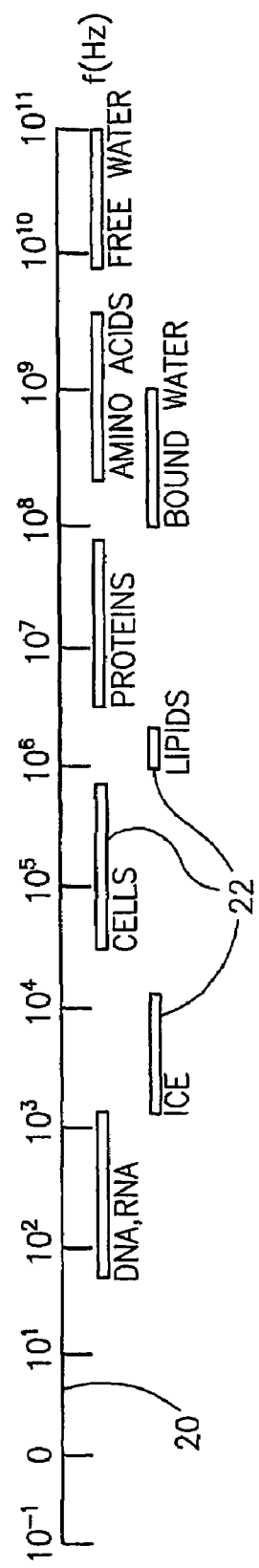
FIG. 1 schematically shows dielectric relaxation frequencies for different types of molecules and structures of matter.

FIG. 1 schematically shows dielectric relaxation frequencies for types of molecules and structures commonly found in biological systems. Dielectric relaxation frequency is shown along an axis 20. Below and along axis 20 are witness bars 22, each labeled with a molecule type or structure. Each witness bar 22 indicates a range of dielectric relaxation frequencies that is characteristic of the type of molecule or structure that labels the witness bar. A structure or molecule contributes to the dielectric permittivity of a material in which it is found at frequencies below its dielectric relaxation frequency. For frequencies above its dielectric relaxation frequency, the contribution of the structure or molecule to the dielectric permittivity of the material decreases rapidly and for frequencies substantially greater than its dielectric relaxation frequency the contribution to the dielectric permittivity is substantially zero.

From FIG. 1 is seen that water, in liquid form, has the highest dielectric relaxation frequency among molecules and structures commonly found in biological systems. Similarly, for non-biological materials in which water is present, the water generally has a dielectric relaxation frequency that is greater than the dielectric relaxation frequencies of other components and structures of the materials. Therefore, for many materials in which water is present, for frequencies in the range of the dielectric relaxation frequencies of water, the dielectric permittivities of the materials are due primarily to the dielectric permittivity of water. For these materials, water is a suitable indicator component for measuring temperature of the materials, in accordance with an embodiment of the present invention. Isolation frequencies for water in the materials are frequencies that fall in the range of dielectric relaxation frequencies of water.

Figure 2A:
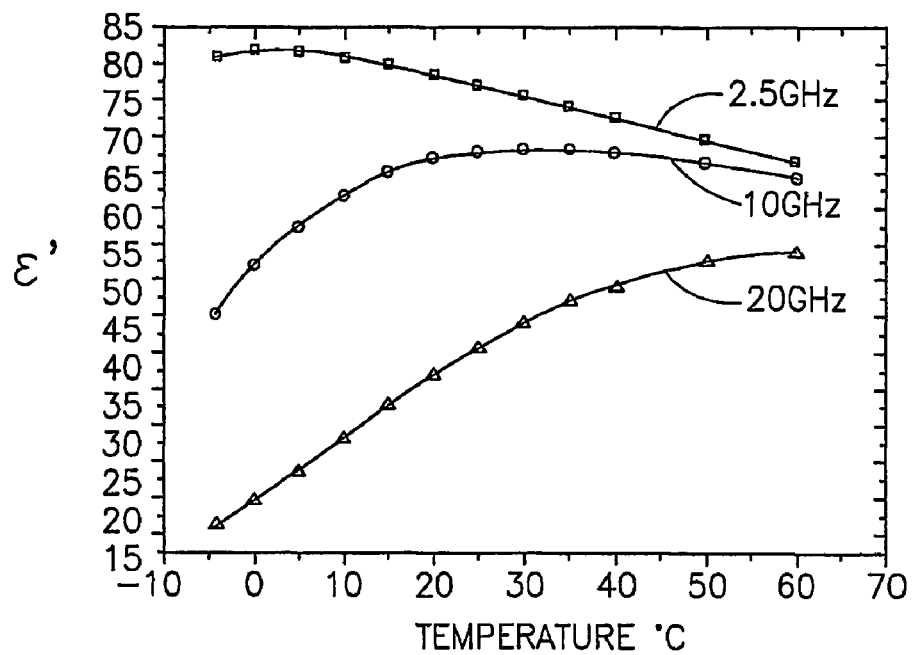
FIGS. 2A and 2B are graphs of the real and imaginary parts of the dielectric permittivity of water at three different isolation frequencies.
Figure 2B:
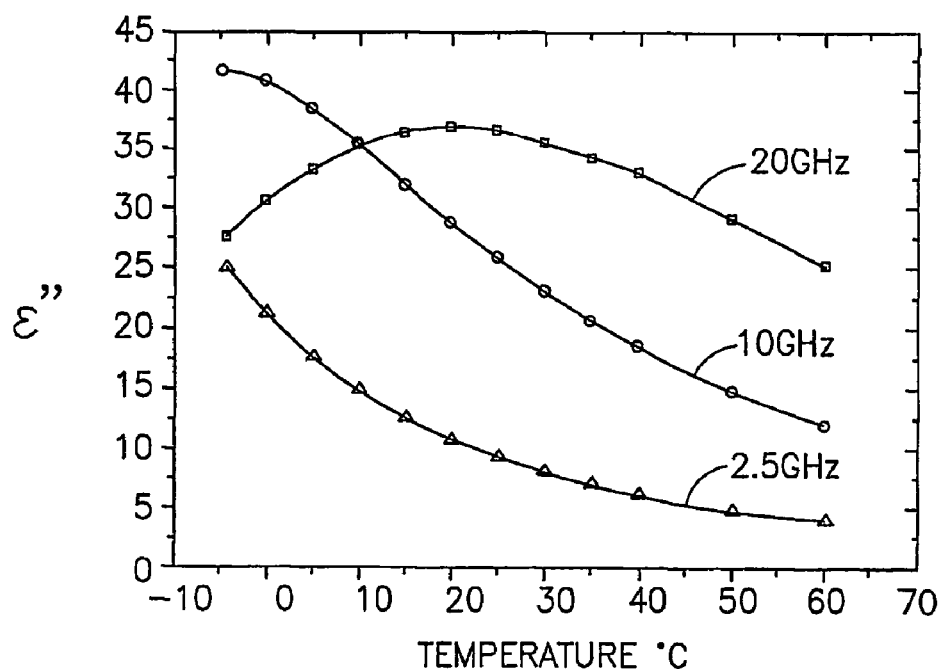

The dielectric properties of water are well known and the complex dielectric permittivity "$\epsilon^*(\omega,T)$" of water as a function of frequency "$\omega$" and temperature "T" is relatively accurately approximated by $\epsilon^*(\omega,T) = \epsilon'(\omega,T) + i\epsilon''(\omega,T) = \epsilon_\infty + (\epsilon_s - \epsilon_\infty)/(1 + i\omega\tau(T))$, where i is the imaginary i. In the expression for $\epsilon^*(\omega,T)$, $\delta_s$ is the "static" value of $\epsilon^*(\omega,T)$ for $\omega=0$, $\epsilon_\infty$ is the value of $\epsilon^*(\omega,T)$ for $\omega=\infty$ and dependence of $\epsilon^*(\omega,T)$ on temperature T is through a relaxation time $\tau(T)$. Various theoretical models for dependence of $\tau(T)$ on temperature are known and values for $\tau(T)$ as a function of temperature for pure water are tabulated. The inverse of $\tau$ is the dielectric relaxation frequency of water at the temperature T. FIGS. 2A and 2B are graphs of the real part $\epsilon'(\omega,T)$ and imaginary part $\epsilon''(\omega,T)$ respectively of the complex dielectric permittivity $\epsilon^*(\omega,T)$ of water as a function of temperature for "isolation" frequencies 2.5 GHz, 10 GHz and 20 GHz.

As noted above, at an isolation frequency of water, the dielectric permittivity of a material containing water is not a function only of the dielectric permittivity of the water, but is also a function of the concentration of the water in the material. Therefore, to determine temperature of the material from measurement of its dielectric permittivity and known values of the dielectric permittivity of water, in accordance with an embodiment of the present invention, a function of $\epsilon^*(\omega,T)$ that is independent of concentration is determined from the measured dielectric permittivity of the material. Dependence of the function on temperature is used to determine temperature of the material.

Let $\epsilon^*_{mat}(\omega,T)$ represent the complex dielectric permittivity of the material and let the material have a concentration "k" g/m³ of water. It is expected that in general, at an isolation frequency for water, $\epsilon^*_{mat}(\omega,T)$ will be equal to $k\epsilon^*(\omega,T)$. Therefore, ratios between measurements of real and imaginary parts of $\epsilon^*_{mat}(\omega,T)$ can be used to determine suitable functions of $\epsilon^*_{mat}(\omega,T)$ that are independent of concentration and can be used to determine temperature, in accordance with an embodiment of the present invention.

For example, a ratio between the real and imaginary parts of $\epsilon^*_{mat}(\omega,T)$ at a same frequency determines a ratio between the real and imaginary parts of $\epsilon^*_{mat}(\omega,T)$ at the frequency and can be used to determine temperature of the material from known values of $\epsilon^*_{mat}(\omega,T)$. Similarly, a ratio between real and/or imaginary parts of $\epsilon^*_{mat}(\omega,T)$ at different frequencies determines a ratio between corresponding real and/or imaginary parts of $\epsilon^*_{mat}(\omega,T)$ at the frequencies and can be used, in accordance with an embodiment of the present invention, to determine temperature of the material.

Figure 3A:
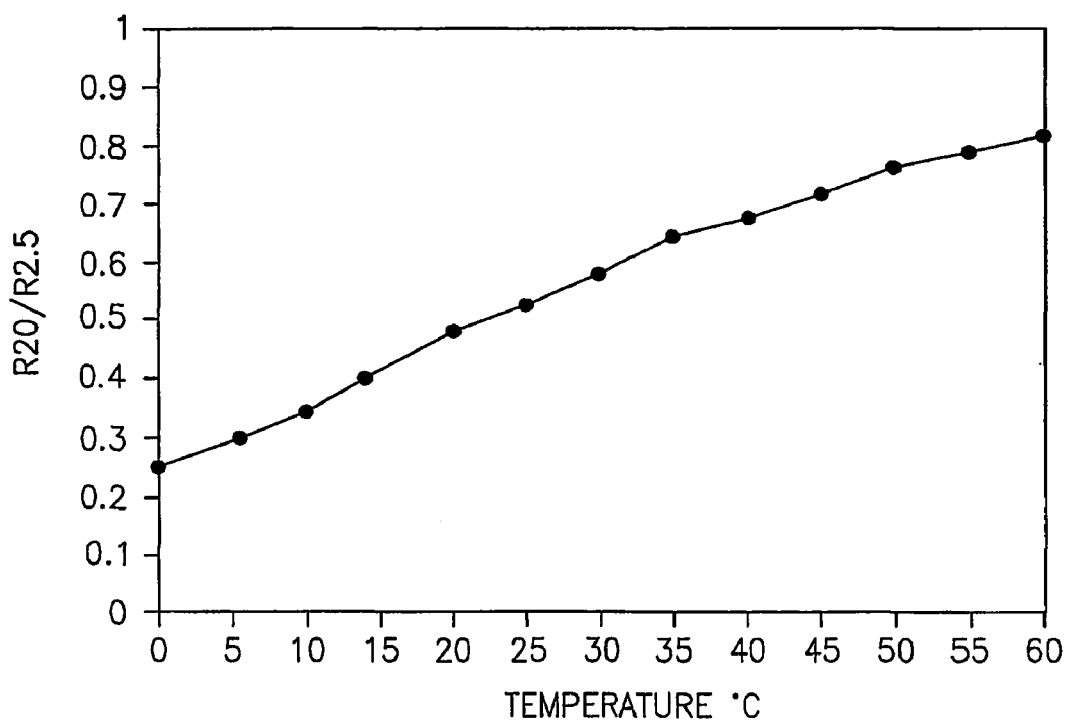
FIG. 3A is a graph of a ratio of the real to imaginary part of the dielectric permittivity of water for a frequency of 20 GHz as a function of temperature, which is used to determine temperature of a material, in accordance with an embodiment of the present invention.

FIG. 3A is a graph of a ratio "R20/R2.5" =Re[$\epsilon^*(20,T)$]/Re[$\epsilon^*(2.5,T)$] between the real part, Re[$\epsilon^*(20,T)$], of $\epsilon^*(\omega,T)$ and the imaginary part, Re[$\epsilon^*(2.5,T)$], of $\epsilon^*(\omega,T)$ at 2.5 GHz as a function of temperature in a range of temperatures from 0–60° C. From the graph it is seen that the ratio is a single valued function of temperature and if the value of R20/R2.5 for a material is known, a temperature for the material can be determined.

Presently available sensors for determining the real part of the dielectric permittivity of a material can determine $\epsilon'(\omega,T)$ to an accuracy of about 0.1%. The ratio R20/R2.5 can therefore be determined to about 0.14% and temperature of the material to about 0.15° C.

Figure 3B:
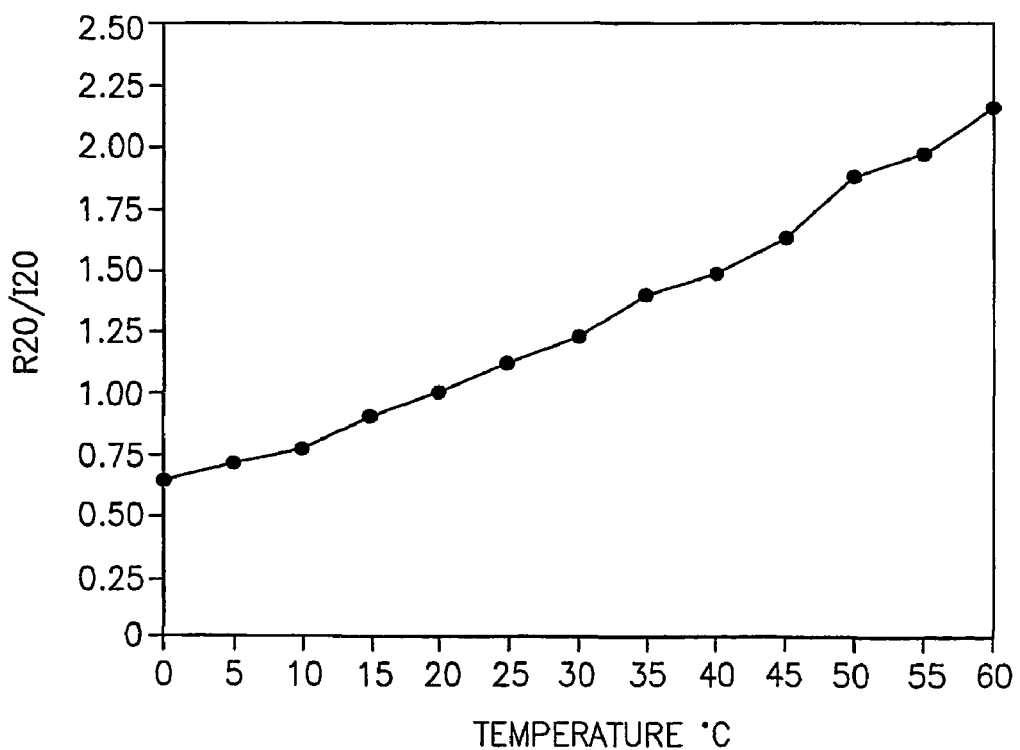
FIG. 3B is a graph of a ratio between the real parts of the dielectric permittivity of water at 20 GHz and 2.5 GHz as a function of temperature, which is used to determine temperature of a material, in accordance with an embodiment of the present invention.
Figure 3C:
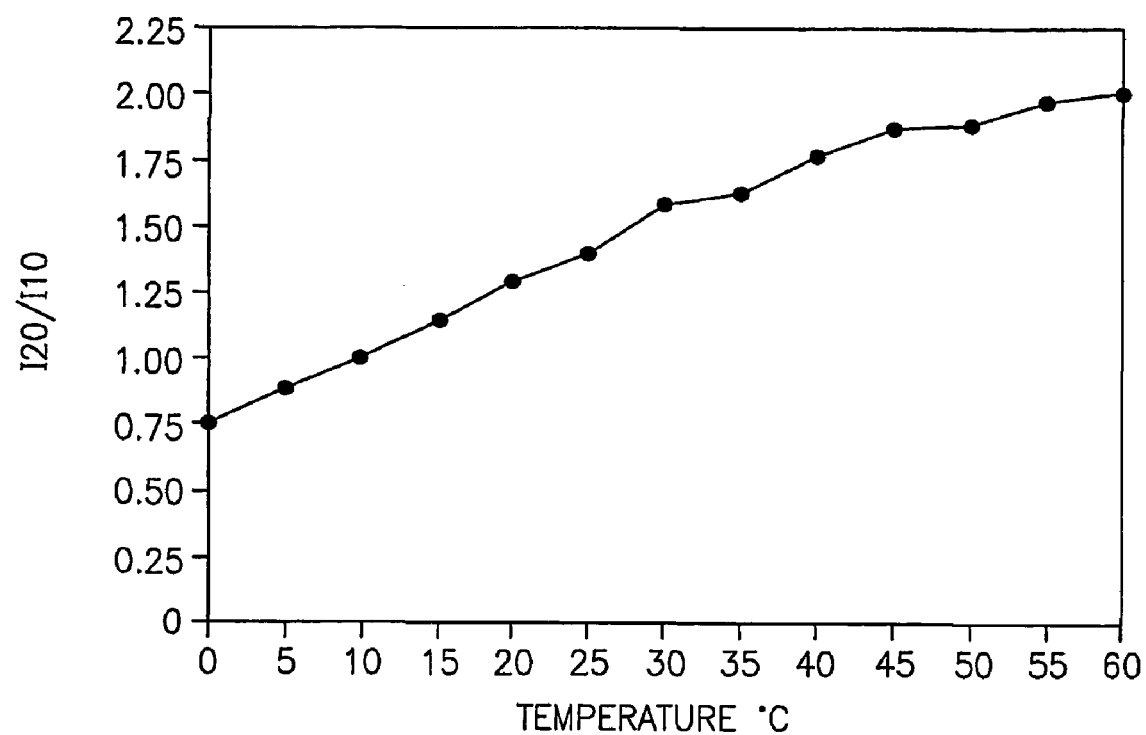
FIG. 3C is a graph of a ratio of the real part of the dielectric permittivity of water at 20 GHz to the imaginary part of the dielectric permittivity at 10 GHz as a function of temperature, which is used to determine temperature of a material, in accordance with an embodiment of the present invention.

FIG. 3B is a graph of a ratio "R20/I20" =Re[$\epsilon^*(20,T)$]/Im[$\epsilon^*(20,T)$] between the real part, Re[$\epsilon^*(20,T)$], of $\epsilon^*(\omega,T)$ and the imaginary part, Im[$\epsilon^*(20,T)$], of $\epsilon^*(\omega,T)$ at 20 GHz as a function of temperature in the range of temperatures from 0–60° C. FIG. 3C is a graph of "I20/I10" between the imaginary part of $\epsilon^*(\omega,T)$ at 20 GHz and the imaginary part of $\epsilon^*(\omega,T)$ at 10 GHz as a function of temperature. From these graphs it is seen that values R20/I20 and I20/I10 determined for a material can also be used to determine temperature of the material, in accordance with an embodiment of the present invention.

Whereas the imaginary part of the dielectric permittivity of a material and/or the real parts of the permittivity are used in accordance with embodiments of the present invention to determine temperature of the material, it is noted that for the imaginary part of the dielectric permittivity of a material, present day methods for measuring dielectric permittivity provide accuracy of measurement of only about 0.5%. As a result, accuracy of temperature measurement using R20/I20 or I20/I10 is generally less than accuracy of temperature measurement using R20/R2.5. For example, using R20/I20 and assuming that Im[$\epsilon^*(20,T)$] is measured to an accuracy of about 0.5% and Re[$\epsilon^*(20,T)$] to an accuracy of about 0.1%, accuracy of temperature measurement for temperatures near 30° C. is about 0.1° C. On the other hand, by using the ratio R20/R2.5, temperatures near 30° C. can be determined to an accuracy of about 0.04° C. It is noted that accuracy of temperature measurement can be improved by determining temperature from suitable ratios between real and/or imaginary parts of the dielectric permittivity at a plurality of different frequencies.

Figure 4:
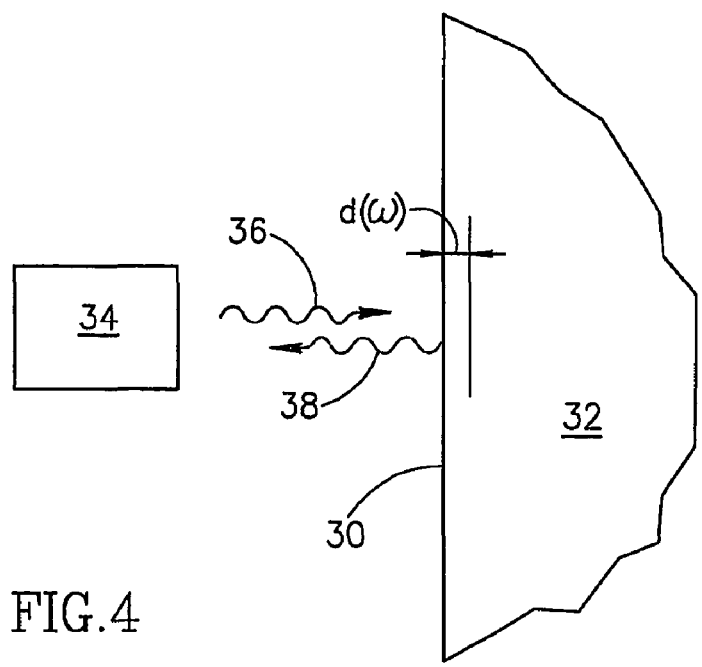
FIG. 4 schematically shows determining temperature of a surface region of a material, in accordance with an embodiment of the present invention.

FIG. 4 schematically shows measuring temperature of a surface region 30 of a material 32 that has a concentration of water, in accordance with an embodiment of the present invention. An appropriate probe 34, such as a probe described in U.S. Pat. No. 5,744,971 is used to generate an electromagnetic wave represented by a solid wavy line 36 at at least one isolation frequency of water that is incident on surface region 30. Energy from incident wave 36 that is reflected by surface region 30 in a reflected wave that is represented by a dashed wavy line 38 is sensed by probe 34, which determines the amplitude and phase of the reflected wave using methods known in the art.

A processor (not shown) in probe 34 uses the measured amplitude and phase of reflected wave 38 to determine a reflectance, "$R(\omega)$", of surface region 30 at the isolation frequency $\omega$ that characterizes incident wave 36. The reflectance in turn is used to determine a value for the dielectric permittivity $\epsilon^*_{mat}(\omega,T)$ of material 32 at surface region 30. For example, assuming that incident wave 36 is normal to surface region 30, the dielectric permittivity of region 30 can be determined from the reflectance from the usual formula $R(\omega) = [1-\epsilon^*_{mat}(\omega,T)^{0.5}]/[1-\epsilon^*_{mat}(\omega,T)^{0.5}]$. A suitable ratio, as discussed above, between real and/or imaginary parts of the dielectric permittivity $\epsilon^*_{mat}(\omega,T)$ at at least one isolation frequency is used to determine temperature of surface region 30.

In accordance with an embodiment of the present invention, intensity of incident wave 36 is limited to prevent the wave from heating surface region 30 during a time that the dielectric permittivity of the region is being measured.

Assume that all energy that is not reflected from incident wave 36 by material 32, is absorbed in a region of material 32 that extends from surface region 30 to a depth equal to about one absorption length "$d(\omega)$" for wave 36 into material 32. Under this assumption, energy from incident wave 36 that is not reflected in reflected wave 38 heats a volume of material per square centimeter of surface region 30 equal to about $d(\omega)$ cm$^3$. Let density of the material be represented by "$\rho$" and the specific heat of the material be represented by "$J$". Then temperature T of surface region 30 has a time rate of change dT/dt during exposure to the incident wave that may be approximated by $dT/dt = P_{in}(1-|R(\omega)|^2)/(d(\omega)\rho J)$, where $P_{in}$ is the intensity of incident wave 36.

Assume that the specific heat J of material 32 is equal to the specific heat of water, that $\rho$ is about 1 gm/cm$^3$, that the frequency of the incident wave is 20 GHz and that to prevent the wave from distorting the temperature measurement, dT/dt must be less than or equal to 0.02° C./s. The absorption length $d(\omega)$ for the wave may be estimated by the expression $d(\omega) = \lambda_o(\omega)/[2\pi Im(\epsilon^*(\omega,T)^{0.5})]$ where $\lambda_o(\omega)$ is the free space wavelength of incident wave 36. For $\omega = 20$ GHz, and a temperature of about 35° C., $d(\omega) \cong 0.1$ cm and $|R(\omega)|^2 \cong 0.65$. Then in order for dT/dt to satisfy the relation $dT/dt \leq 0.02$° C./s, $P_{in}$ must satisfy the relation $P_{in} \leq 24$ milliwatts/cm$^2$.

In some embodiments of the present invention, measurements of temperature are corrected for energy deposited by incident wave 36 in material 32 during measurement of temperature of surface 30. The imaginary part of $\epsilon^*_{mat}(\omega,T)$ is used to estimate energy deposited by wave 36 in material 32 during measurement of the temperature of surface 30. The amount of deposited energy is used to estimate heating of material 32 during the measurement of $\epsilon^*_{mat}(\omega,T)$ and correct a temperature of surface 30 determined from $\epsilon^*_{mat}(\omega,T)$. For example, in some embodiments of the present invention, the imaginary part of $\epsilon^*_{mat}(\omega,T)$ is used to estimate energy deposited in a region of material 32 extending from surface 30 to an absorption length $d(\omega)$ inside the material during the measurement. The estimated amount of deposited energy, specific heat and density of material 32 are used to estimate by how much the region is heated during the measurement. The amount of heating is used to correct the temperature determined for surface 30 from $\epsilon^*_{mat}(\omega,T)$.

Figure 5:
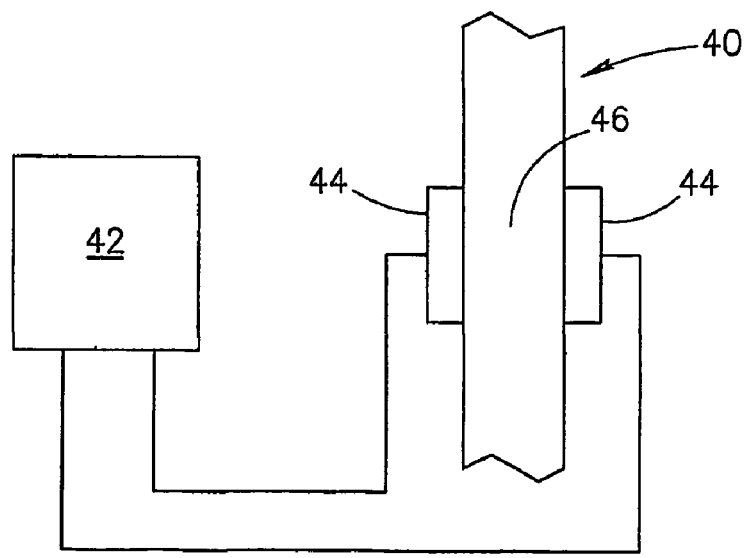
FIG. 5 schematically shows determining an internal temperature of a material, in accordance with an embodiment of the present invention

FIG. 5 schematically illustrates measuring an internal temperature of a material 40 having a concentration of water, in accordance with an embodiment of the present invention.

A probe 42 comprising an appropriate power supply, circuitry, a network analyzer (none of which are shown) and two antennas 44 is used to determine the internal temperature of material 40, in accordance with an embodiment of the present invention. Antennas 44, which may be, for example, strip or horn antennas, or any other antennas suitable for radiating and/or receiving electromagnetic waves at an isolation frequency of water are placed so that they substantially sandwich a volume region 46 of material 40 between them.

The power supply and circuitry in probe 42 generate electromagnetic waves at at least one isolation frequency of water that are radiated from one towards the other of antennas 44. The circuit analyzer, using methods known in the art, determines amplitudes and optionally phases of waves that are reflected by material 40 from a radiated wave and waves that are transmitted through material 40 from the radiated wave. From the amplitudes and phases of the reflected and transmitted waves the circuit analyzer determines an average dielectric permittivity $\epsilon^*_{mat}(\omega,T)$ for volume region 46. A suitable ratio between real and/or imaginary parts of the dielectric permittivity $\epsilon^*_{mat}(\omega,T)$ at at least one isolation frequency is used to determine an average temperature for volume region 46, which is an average internal temperature of the volume region.

For example, in some embodiments of the present invention, the circuit analyzer determines only amplitudes, or energies, of reflected and transmitted waves and a value for an amount of energy absorbed by volume 46 from the radiated wave determined. The amount of absorbed energy is used to determine an average value for the imaginary part of $\epsilon^*_{mat}(\omega,T)$ for volume region 46. A ratio between average values of the imaginary part of $\epsilon^*_{mat}(\omega,T)$ at two isolation frequencies of water can be used to determine the average internal temperature of volume region 46. It is noted that by moving antennas 44 to different regions of material 44 or by positioning an array of antenna pairs similar to antennas 44, internal temperatures for different regions of material 44 can be determined and a thermal map of material 44 provided. Similarly, by moving probe 34 shown in FIG. 4 or by positioning a plurality of probes 34 opposite the surface of material 32 surface temperatures of different surface regions 30 of the material can be determined and a thermal map of the material's surface provided.

In accordance with some embodiments of the present invention dielectric permittivity measurement of temperature is used to determine absorption coefficients of a material for light. The material is illuminated with light at an appropriate wavelength between a first and a second time. Temperature of the material is measured by measuring dielectric permittivity in accordance with an embodiment of the present invention at the first and second times to determine by how much the material is heated by the light. The amount of heating is used to determine an absorption coefficient of the material for the light.

It is known in the art to assay components of a material by measuring absorption coefficients of the material for light. Generally, to perform an assay, absorption coefficients of the material are measured at a plurality of different wavelengths. For example, U.S. Pat. No. 5,452,716 to V. Clift, the disclosure of which is incorporated herein by reference, describes measuring absorption coefficients of blood at a plurality of wavelengths to assay blood glucose. In accordance with embodiments of the present invention, absorption coefficients of a material for light determined from dielectric permittivity measurement of temperature is used to assay components of the material.

Whereas the above discussion describes determining absorption coefficients of a material for light similar methods, in accordance with embodiments of the present invention, may be used for determining absorption coefficients for other types of radiation. Absorption coefficients for substantially any type of radiation that is absorbed by a material can be similarly determined. For example, absorption coefficients for acoustic radiation may be determined from dielectric permittivity temperature measurements, in accordance with an embodiment of the present invention.

In the above description temperature of a material is measured by determining at least one isolation frequency of an indicator component of the material and measuring the dielectric permittivity of the material at the at least one isolation frequency. In some embodiments of the present invention, an isolation frequency is determined for which a plurality of known indicator components of a material contribute to the dielectric permittivity of the material, and other components of the material do not substantially contribute to the dielectric permittivity. Temperature of the material can be determined, in accordance with an embodiment of the present invention, from known dependence of the dielectric permittivity of each of the indicator components by measuring at least one of the real or imaginary parts of the dielectric permittivity of the material at the at least one isolation frequency. Measurements of dielectric permittivity at an isolation frequency corresponding to a plurality of indicator components are used to determine temperature similarly to the way in which measurements of dielectric permittivity at an isolation frequency corresponding to a single indicator component is used to determine temperature. However, for the case of an isolation frequency of a plurality of indicator components, relative concentrations of the known components must be known in order to determine a dependence of the dielectric constant of the material at the isolation frequency on temperature.

It is noted that determining temperature from measurements of dielectric permittivity, in accordance with embodiments of the present invention, is applicable to determining temperature of various different types of materials. In particular, dielectric temperature measurement, in accordance with an embodiment of the present invention, is useable for measuring temperature of living tissue. For example, a person's temperature can be measured in accordance with an embodiment of the present invention by measuring dielectric permittivity of a region of the person's ear. Or dielectric temperature measurement, in accordance with an embodiment of the present invention, can be used to measure temperature of a region of a person's body undergoing ultrasonic, hyperthermia or cryogenic treatment for cancer.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for determining temperature of a material comprising:

determining the permittivity of the material as a function of temperature;

measuring at least one of the real and imaginary parts of the permittivity of the material at each of at least one frequency; and using at least one of the determined real and imaginary part of the permittivity at each of the at least one frequency and the dependence of the permittivity on temperature to determine temperature of the material.

2. A method according to claim 1 wherein using at least one of the measured real and imaginary parts of the permittivity to determine temperature, comprises determining a value for a ratio between the real and imaginary parts of the permittivity measured at a same frequency of the at least one frequency and determining temperature from the value.

3. A method according to claim 1 wherein the at least one frequency comprises first and second frequencies and using the measured real and/or imaginary part of the permittivity to determine temperature comprises determining a value for a ratio between the real or imaginary part of the permittivity at the first frequency and the real or imaginary part of the permittivity at the second frequency and determining temperature from the value.

4. A method according to claim 1 wherein determining permittivity as a function of temperature comprises determining the permittivity responsive to the permittivities of a plurality of components of the material and their relative concentrations.

5. A method according to claim 1 wherein the material is living tissue.

6. A method according to claim 5 wherein the living tissue is tissue in an ear.

7. A method according to claim 1 wherein determining the permittivity as a function of temperature comprises determining the permittivity to be equal to that of a single component of the material whose permittivity as a function of temperature is known.

8. A method according to claim 7 wherein the known component of the material is a dipolar molecule that is not bonded to another molecule.

9. A method according to claim 8 wherein the dipolar molecule is water.

10. A method according to claim 9 wherein the at least one frequency is a frequency in a range from about $10^{10}$ Hz to about $50 \times 10^{10}$ Hz.

11. A method according to claim 1 wherein measuring the real and/or imaginary part of the permittivity at each of the at least one frequency comprises measuring the real and/or imaginary part of the permittivity inside the material and determining a temperature comprises determining an internal temperature of the material.

12. A method according to claim 11 wherein measuring the real and/or imaginary part of the permittivity inside the material comprises:

directing an electromagnetic wave so that it is incident on the material;

measuring amplitude and phase of an electromagnetic wave reflected by the material from the incident wave;

measuring amplitude and phase of an electromagnetic wave resulting from the incident wave that is transmitted through the material; and determining an average for the real and imaginary parts of the permittivity inside the material from the measured amplitudes and phases.

13. A method according to claim 11 wherein measuring the real and/or imaginary part of the permittivity inside the material comprises measuring amounts of energy reflected by the material and transmitted through the material from energy of an electromagnetic wave incident on the material and determining from the reflected and transmitted energies an avenge imaginary part of the permittivity inside the material.

14. A method according to claim 13 and comprising limiting power in the incident electromagnetic wave so that during a time that it takes to measure the real and/or imaginary part of the dielectric permittivity, an amount of energy absorbed by the material from the incident wave does not substantially change the temperature of the material.

15. A method according to claim 13 wherein determining temperature of the material comprises estimating an amount by which energy absorbed by the material from the incident electromagnetic wave changes temperature of the material during measurement of the real and/or imaginary part of the permittivity and using the estimated change to determine the temperature.

16. A method comprising determining the internal temperature of a material at a plurality of internal locations of the material in accordance with claim 11 and using the temperatures determined at the plurality of locations to generate a thermal map of an internal region of the material.

17. A method according to claim 1 wherein measuring the real and/or imaginary part of the permittivity of the material at each of the at least one frequency comprises measuring the dielectric permittivity near a surface region of the material and determining a temperature comprises determining a temperature of the material at or in the neighborhood of the surface region.

18. A method comprising measuring the temperature of each of a plurality of surface regions of a material in accordance with the method of claim 17 and using the temperatures determined at the plurality of surface regions to generate a thermal surface map of the material.

19. A method according to claim 17 wherein measuring the real and/or imaginary part of the permittivity near the surface region comprises measuring reflectance of the surface region for an electromagnetic wave incident thereon and determining the real and/or imaginary part of the permittivity in a region of the material at or in the neighborhood of the surface region from the reflectance.

20. A method comprising determining the internal temperature of a material at a plurality of internal locations of the material in accordance with claim 19 and using the temperatures determined at the plurality of locations to generate a thermal map of an internal region of the material.

21. A method according to claim 19 wherein determining temperature of the material comprises estimating an amount by which energy absorbed by the material from the incident electromagnetic wave changes temperature of the material during measurement of the real and/or imaginary part of the permittivity and using the estimated change to determine the temperature.

22. A method according to claim 19 and comprising limiting power in the incident electromagnetic wave so tat during a time that it takes to measure the real and/or imaginary part of the dielectric permittivity, an amount of energy absorbed by the material from the incident wave does not substantially change the temperature of the material.

23. A method according to claim 22 wherein the power is determined so tat a rate of temperature change is less than about 0.05 degrees Celsius per second.

24. A method according to claim 22 wherein the power is determined so that a rate of temperature change is less than about 0.02 degrees Celsius per second.

25. A method for determining an amount of radiation absorbed by a material comprising:

illuminating the material with the radiation between a first time and a second time;

measuring temperature of the material at the first and second times according to claim 1; and using a difference between the measured temperatures at the first and second times to determine an amount of energy absorbed from the radiation by the material.

26. A method according to claim 25 wherein the radiation is acoustic radiation.

27. A method according to claim 25, wherein the material is living tissue.

28. A method according to claim 25 wherein the radiation is electromagnetic radiation.

29. A method according to claim 28 wherein the electromagnetic radiation is light.

30. A method according to claim 29 wherein the light is IR light.

31. A method comprising determining an amount of radiation absorbed by a material at each of a plurality of regions of the material according to claim 25 and using the amounts of absorption at the plurality of regions to provide a spatial map of the absorption of the radiation by the material.

32. A method for assaying a component of a material comprising:

determining an amount of radiation absorbed by the material in accordance with claim 25;

determining an absorption coefficient of the component for the radiation from the amount of absorbed energy; and determining a concentration of the component in the material from the determined absorption coefficient and a known absorption cross-section of the component.

33. A method of mapping concentration of a component in a material comprising:

assaying the component in accordance with claim 32 at a plurality of regions of the material; and using the assays at the plurality of regions to map concentration of the material as a function of position.

* * * * *